US012695160B2

(12) United States Patent     (10) Patent No.: US 12,695,160 B2
Yun et al.                        (45) Date of Patent:      Jul. 28, 2026

(54) FFC BUS BAR

(71) Applicant: LG Energy Solution, Ltd., Seoul (KR)

(72) Inventors: Sun-Woo Yun, Daejeon (KR);
Sung-Tack Hwang, Daejeon (KR)

(73) Assignee: LG Energy Solution, Ltd., Seoul (KR)

( * ) Notice: Subject to any disclaimer, the term of this
patent is extended or adjusted under 35
U.S.C. 154(b) by 612 days.

(21) Appl. No.: 18/010,021

(22) PCT Filed: Jul. 12, 2021

(86) PCT No.: PCT/KR2021/008890
§ 371 (c)(1),
(2) Date: Dec. 13, 2022

(87) PCT Pub. No.: WO2022/065647
PCT Pub. Date: Mar. 31, 2022

(65) Prior Publication Data
US 2023/0253685 A1     Aug. 10, 2023

(30) Foreign Application Priority Data
Sep. 28, 2020     (KR) ........................ 10-2020-0126047

(51) Int. Cl.
*H01M 50/516*     (2021.01)
*H01B 7/04*       (2006.01)
*H01B 7/08*       (2006.01)
*H02G 5/00*       (2006.01)
(52) U.S. Cl.
CPC ............ *H01M 50/516* (2021.01); *H01B 7/04*
(2013.01); *H01B 7/08* (2013.01); *H02G 5/007*
(2013.01)

(58) Field of Classification Search
CPC ........... H01M 50/50–503; H01M 50/507–522;
H01M 50/526; H01M 50/528–529; H01B
7/04–041; H01B 7/08; H02G 5/00–007
See application file for complete search history.

(56) References Cited

U.S. PATENT DOCUMENTS

| | | | |
|---|---|---|---|
| 4,922,068 A | 5/1990 | Bangs | |
| 6,323,428 B1 | 11/2001 | Takano | |
| 8,628,335 B1 | 1/2014 | Zhao | |
| 11,610,700 B2* | 3/2023 | Jung | ........................ H01B 7/02 |

(Continued)

FOREIGN PATENT DOCUMENTS

| | | |
|---|---|---|
| CN | 102084517 A | 6/2011 |
| JP | H0562754 A | 3/1993 |

(Continued)

OTHER PUBLICATIONS

Extended European Search Report including Written Opinion for
Application No. 21872681.8 dated Nov. 28, 2023, pp. 1-10.

(Continued)

*Primary Examiner* — Nicole M. Buie-Hatcher
*Assistant Examiner* — Jacob Buchanan
(74) *Attorney, Agent, or Firm* — Lerner David LLP

(57)     ABSTRACT
An FFC bus bar includes a cable stack structure formed by
stacking a plurality of flat flexible cables, and a high current
terminal connected to at least one end portion of the cable
stack structure. Each flat flexible cable comprises a terminal
access portion including strands of conductor wires at at
least one end portion thereof, and the terminal access portion
is welded to the high current terminal.

12 Claims, 6 Drawing Sheets

(56)     References Cited

U.S. PATENT DOCUMENTS

| | | | |
|---|---|---|---|
| 2011/0198122 A1 | 8/2011 | Sagawa et al. | |
| 2012/0328920 A1 | 12/2012 | Takase et al. | |
| 2018/0047958 A1 | 2/2018 | Sato et al. | |
| 2018/0174716 A1 | 6/2018 | Kominato et al. | |
| 2018/0309281 A1 | 10/2018 | Ichikawa et al. | |
| 2019/0165502 A1* | 5/2019 | Hiroki | H01R 12/59 |
| 2020/0143957 A1 | 5/2020 | Kim et al. | |

FOREIGN PATENT DOCUMENTS

| | | | |
|---|---|---|---|
| JP | 2000050472 A | 2/2000 | |
| JP | 2002015792 A | 1/2002 | |
| JP | 2002238141 A | 8/2002 | |
| JP | 2005318735 A | 11/2005 | |
| JP | 4010529 B2 | 11/2007 | |
| JP | 2011124178 A | 6/2011 | |
| JP | 2011210710 A | 10/2011 | |
| JP | 2014032907 A | 2/2014 | |
| JP | 2018181780 A | 11/2018 | |
| JP | 6533500 B2 | 6/2019 | |
| JP | 6604648 B1 | 11/2019 | |
| JP | 202017396 A | 1/2020 | |
| JP | 2021077568 A | 5/2021 | |
| KR | 200248915 Y1 | 11/2001 | |
| KR | 20170136857 A | 12/2017 | |
| KR | 101844270 B1 | 4/2018 | |
| KR | 20180037364 A | 4/2018 | |
| KR | 102102409 B1 | 4/2020 | |

OTHER PUBLICATIONS

International Search Report for Application No. PCT/KR2021/008890 mailed Oct. 25, 2021, pp. 1-3.

* cited by examiner

FFC BUS BAR

CROSS-REFERENCE TO RELATED APPLICATIONS

The present application is a national phase entry under 35 U.S.C. § 371 of International Application No. PCT/KR2021/008890 filed Jul. 12, 2021, which claims priority from Korean Patent Application No. 10-2020-0126047 filed Sep. 28, 2020, all of which are incorporated herein by reference.

TECHNICAL FIELD

The present disclosure relates to a flat flexible cable (FFC) bus bar, and more particularly, to an FFC bus bar in which bonding reliability between flat conductor wires of a flat flexible cable and a terminal of a bus bar is improved.

BACKGROUND ART

Examples of the currently commercialized secondary batteries include a nickel cadmium battery, a nickel hydrogen battery, a nickel zinc battery, a lithium secondary battery, and among these, the lithium secondary battery hardly has memory effect compared to nickel-based secondary batteries and is easily charged or discharged, has a low self-discharge rate and high energy density, and is thus popular for these advantages.

Recently, secondary batteries are used not only in compact devices such as portable electronic devices but also in middle-to-large sized devices such as electric vehicles or energy storage systems (ESS).

However, it is difficult to obtain sufficient output that allows to drive an electric vehicle from a single secondary battery (cell). In order to apply a secondary battery as an energy supply for an electric vehicle, it is necessary to configure a battery module in which a plurality of secondary battery cells are connected in series and/or in parallel, and in general, a battery pack is configured, in which the battery modules are connected in series and includes a battery management system (BMS) that functionally retains the battery modules and a cooling system, a battery disconnection unit (BDU), or the like.

When configuring the battery pack, a large number of bus bars are used to connect battery modules or other electric parts. The bus bar is manufactured using a copper or aluminum material and in a bar shape, and has low impedance and a high current capacity to allow application of high current, and is useful to be used in a battery pack which has a narrow installation space.

The bus bar may be classified into rigid bus bars which have a large allowable current capacity but installation paths of which are fixed and flexible bus bars that are bendable or twistable. Due to the flexibility of the flexible bus bars, installation paths may be configured in various manners with the flexible bus bars, which are thus more popular than the rigid bus bars.

As the recent trend of electric vehicles is shifting from Hybrid Electric Vehicles (HEV) to Plug-in Hybrid Electric Vehicles (PHEV), and then to Electric Vehicles (EV), the current capacity has increased, and accordingly, bus bars having a large cross-sectional area (SQ) or thickness are in demand However, in the case of flexible bus bars, when the cross-sectional area or thickness thereof is increased, the bending process, which characterizes the unique advantages of flexible bus bars becomes impossible.

To compensate for this, an FFC bus bar including flat flexible cables 1 stacked in layers and a high current terminal 2 connected to ends of the flat flexible cables 1 has been developed. As illustrated in FIG. 1, the FFC bus bars according to the related art have a structure in which a plurality of stacked conductor wires 3 are covered with a bracket 4 to connect the plurality of stacked conductor wires 3 to the high current terminal 2, and the bracket 4 is fixed to the high current terminal 2 by using rivets. However, the weak fixing force of the FFC bus bars according to the related art with respect to conductor wires, which results in easy separation of the conductor wires from the high current terminal, is often mentioned as their drawback.

SUMMARY

Technical Problem

The present disclosure is designed to solve the problems of the related art, and therefore the present disclosure is directed to providing an FFC bus bar having a firm connection structure between conductor wires and a high current terminal.

These and other objects and advantages of the present disclosure may be understood from the following detailed description and will become more fully apparent from the exemplary embodiments of the present disclosure. Also, it will be easily understood that the objects and advantages of the present disclosure may be realized by the means illustrated in the appended claims and combinations thereof.

Technical Solution

In one aspect of the present disclosure, there is provided an FFC bus bar including: a cable stack structure including a stack of a plurality of FFCs; and a high current terminal connected to at least one end portion of the cable stack structure, wherein each flat flexible cable comprises a respective terminal access portion including a respective plurality of strands of conductor wires positioned at the at least one end portion of the cable stack structure, and each respective terminal access portion is welded to the high current terminal.

The high current terminal may include a plurality of welding sheets, wherein each welding sheet is a thin plate, and the terminal access portions of the plurality of FFCs and the plurality of welding sheets may be arranged in alternating layers.

The high current terminal may include: a middle part connected to the welding sheets; and a fastening part comprising a bolt-fastening hole and extending from the middle part away from the welding sheets.

The welding sheets, the middle part, and the fastening part may be integrally formed of a metal material.

The middle part may be a rectangular plate, and a surface of the middle part facing toward the cable stack structure may have a surface area corresponding to a cross-sectional area of the cable stack structure.

Each welding sheet may be a silver-coated copper plate.

Each welding sheet may include: a flat base portion; and a plurality of protrusions protruding from a surface of the base portion at fixed intervals, wherein each of the plurality of protrusions extends from the middle part of the high current terminal along a width direction of the flat base portion, wherein, for each respective welding sheet, the plurality of strands of conductor wires of the terminal access portion stacked adjacent to the respective welding sheet are arranged in concave spaces between the plurality of protrusions of the respective welding sheet.

The FFC bus bar may further include a silver plating layer positioned in the concave spaces.

The FFC bus bar may further include a heat shrink tube integrally surrounding the plurality of flat flexible cables.

The FFC bus bar may further include a compression band surrounding a circumference of a portion of the FFC bus bar in which the plurality of terminal access portions and the plurality of welding sheets are arranged.

In another aspect of the present disclosure, there is provided a battery pack including one or more of the FFC bus bars described in any of the embodiments herein.

Advantageous Effects

According to an aspect of the present disclosure, an FFC bus bar having a firm connection structure between conductor wires and a high current terminal may be provided.

In addition, the FFC bus bar according to the present disclosure has a structure in which a terminal access portion of each flat flexible cable and each welding sheet of the high current terminal are in contact with each other on a one-on-one basis and welded into a single body in the contacting state, and thus, the mechanical rigidity of a connecting portion between each flat flexible cable and the high current terminal is high. Furthermore, by not using components such as rivets or brackets, the high current terminal portion of the FFC bus bar may be simplified and reduced in size.

The effects of the present disclosure are not limited to the above-described effects, and effects not mentioned herein will be clearly understood by those of ordinary skill in the art to which the present disclosure belongs, from the present specification and accompanying drawings.

DETAILED DESCRIPTION

Figure 1:
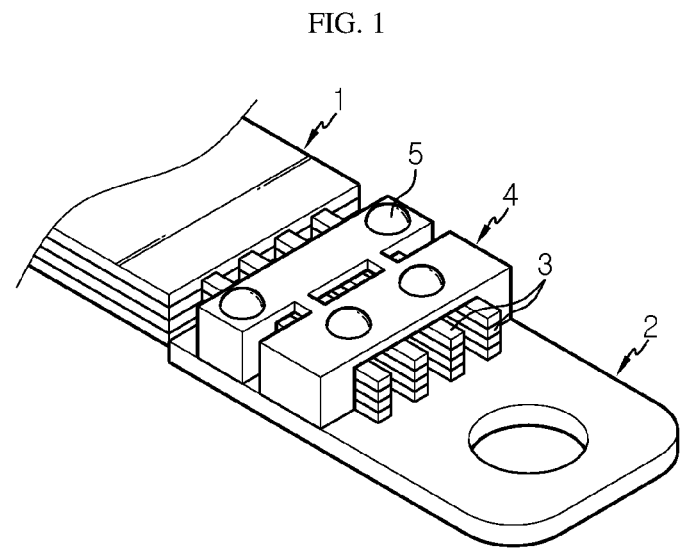
FIG. 1 is a schematic view of an end portion of an FFC bus bar according to the related art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The embodiments of the present disclosure are provided so that this disclosure will be thorough and complete, and will fully convey the present disclosure to one of ordinary skill in the art. In the drawings, shapes and sizes of components may be exaggerated or omitted or schematically illustrated for clear description. Thus, the size or ratio of each constituent element does not perfectly reflect an actual size.

A flat flexible cable (FFC) bus bar to be described below may be used, for example, to connect two battery modules with each other in series or to electrically connect a terminal of a battery module to a relay or connect devices in a battery pack to each other.

The FFC bus bar according to the present disclosure does not have to be used only in battery packs. That is, the FFC bus bar may be used as an electrical connection component for various devices or equipment through which a high voltage or a high current flows.

Figure 2:
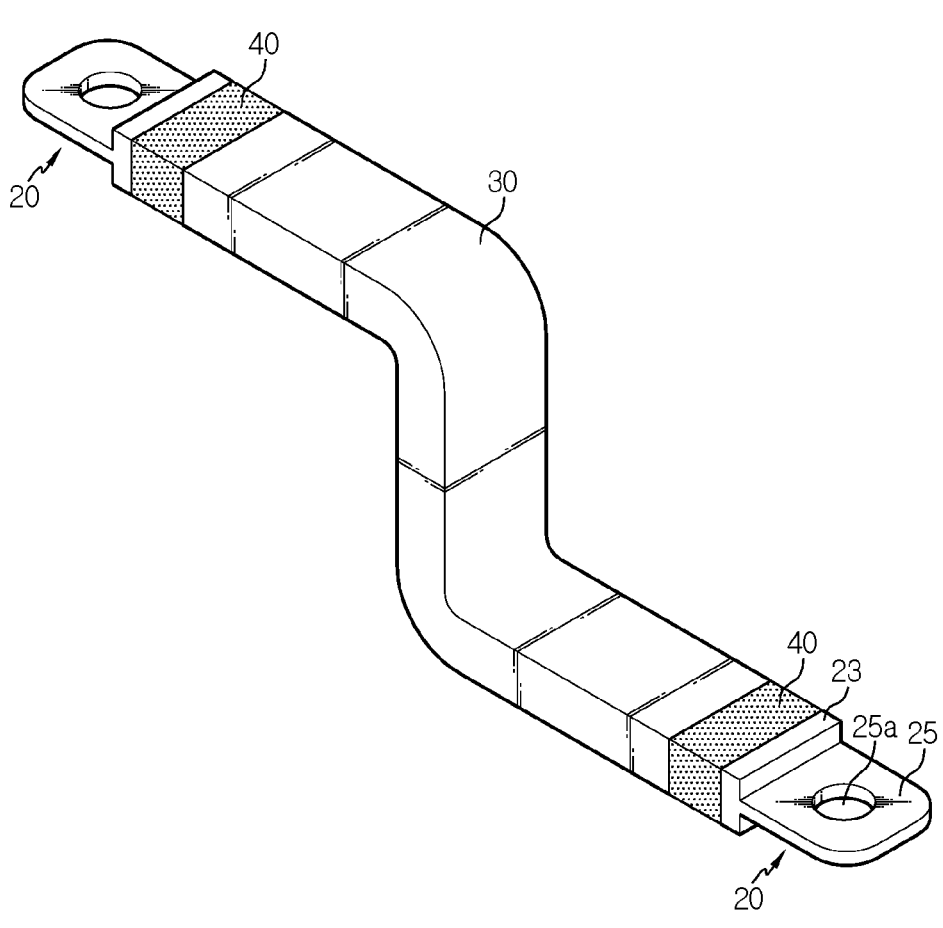
FIG. 2 is a schematic perspective view of an FFC bus bar according to an embodiment of the present disclosure.
Figure 3:
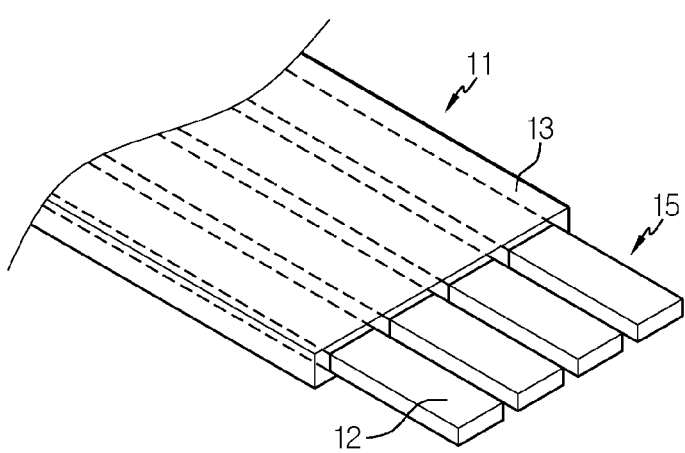
FIG. 3 illustrates an end portion of a flat flexible cable according to an embodiment of the present disclosure.
Figure 4:
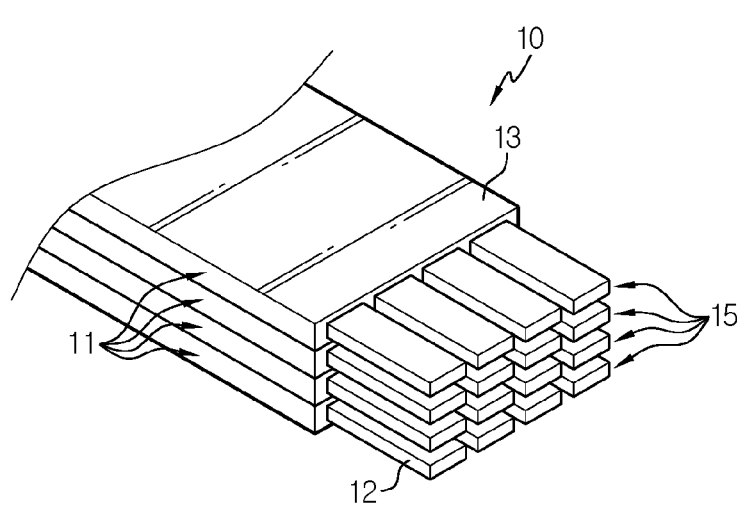
FIG. 4 illustrates an end portion of a cable stack structure according to an embodiment of the present disclosure.
Figure 5:
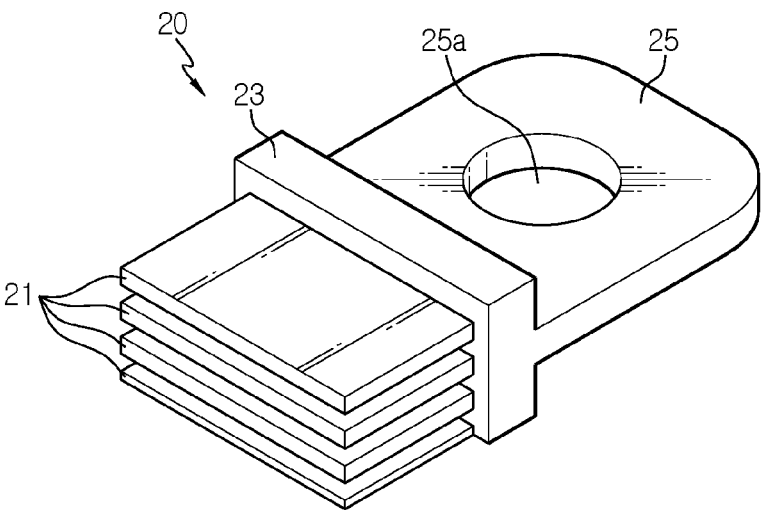
FIG. 5 illustrates a high current terminal according to an embodiment of the present disclosure.

FIG. 2 is a schematic perspective view of an FFC bus bar according to an embodiment of the present disclosure. FIG. 3 illustrates an end portion of a flat flexible cable according to an embodiment of the present disclosure. FIG. 4 illustrates an end portion of a cable stack structure according to an embodiment of the present disclosure. FIG. 5 illustrates a high current terminal according to an embodiment of the present disclosure.

Referring to these drawings, the FFC bus bar according to an embodiment of the present disclosure includes a cable stack structure 10, a high current terminal 20, and a heat shrink tube 30 surrounding the cable stack structure.

The cable stack structure 10 is a stack including a plurality of stacked flat flexible cables 11. Each flat flexible cable 11 includes a plurality of conductor wires 12 extending in parallel with each other and an insulating film 13, as illustrated in FIG. 3.

In addition, each flat flexible cable 11 is provided with a terminal access portion 15, at least at one end of which the plurality of conductor wires 12 are not covered with the insulating film 13. The terminal access portion 15 is a portion connected to the high current terminal 20 by welding. A detailed description thereof will be given later.

The plurality of conductor wires 12 may be manufactured by processing a thin copper plate to have a certain width and thickness, and the conductor wires 12 may be arranged side by side at certain intervals and covered with the insulating film 13.

The insulating film 13 may include a base film 13a and a coverlay film 13b, and may be formed of a polyimide material having excellent insulation characteristics and high heat resistance. The plurality of conductor wires 12 may be arranged on and adhered to the base film 13a at certain intervals, and the coverlay film 13b may be adhered thereon.

When the plurality of flat flexible cables 11 are stacked to form the cable stack structure 10, and a high current terminal is connected thereto, an FFC bus bar which is lightweight and flexible and allows high current conduction may be provided.

In other words, an allowable current capacity of a single conductor wire 12 of the flat flexible cable 11 may vary depending on a material and a cross-sectional area (SQ) thereof, but each conductor wire 12 may correspond to a current of approximately 3 A. Therefore, in a simple calculation, for example, one flat flexible cable 11 including ten strands of conductor wires 12 may correspond to a current of about 30 A, and a cable stack structure formed by stacking ten flat flexible cables 11 may correspond to a current of about 300 A.

The cable stack structure 10 according to the present embodiment is obtained by stacking four flat flexible cables 11 each including four strands of conductor wires 12. This is an example, and to increase the allowable current capacity compared to the present embodiment, the number of conductor wires 12 of each flat flexible cable 11 may be increased, or the number of layers of the flat flexible cable 11 may be increased.

The flat flexible cables 11 may be wrapped with the heat shrink tube 30 so as not to be separated from each other. The heat shrink tube 30 is formed of a polyolefin or polypropylene material, and accordingly, when heat is applied thereto, the heat shrink tube 30 may be tightly wrapped around the plurality of flat flexible cables 11 to bind the flat flexible cables 11 such that they are not moved. The above-described cable stack structure 10 may be bent or twisted, and provided as three-dimensional wiring as a flexible bus bar according to the related art. As an alternative to the heat shrink tube 30, the plurality of flat flexible cables 11 may be taped using an insulating tape (not shown) to be bundled together.

The high current terminal 20 may be connected to an external terminal, and may be regarded as a medium to allow a high current flowing in from the external terminal to flow to each conductive wire 12 of the cable stack structure 10.

The high current terminal 20 is to be electrically and mechanically connected to one end portion of the cable stack structure 10 and also to be easily connected to a terminal of a battery module or a terminal of an electric part such as a relay device.

Figures 6, 7:
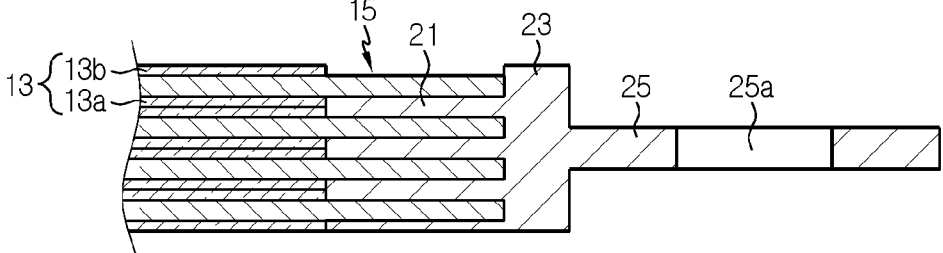
FIG. 6 illustrates a state in which a cable stack structure and a high current terminal, according to an embodiment of the present disclosure, are connected to each other.
FIG. 7 is a cross-sectional view cut along line A-A' of FIG. 6.

The high current terminal 20 according to the present embodiment may include a plurality of welding sheets 21, a middle part 23, and a fastening part 25 to be welded to the terminal access portion 15 of the cable stack structure 10, as illustrated in FIGS. 5 and 6.

The welding sheets 21 are in the form of a thin plate sheet that may be in one-to-one contact with the terminal access portion 15 of each of the flat flexible cables 11, and may be provided in multiple stages.

In addition, the welding sheets 21 may be configured to have spaces therebetween to allow the terminal access portion 15 of each flexible flat cable 11 to be arranged therebetween. By arranging the terminal access portion 15 of each of the flat flexible cables 11 between the welding sheets 21, the terminal access portion 15 of each of the flat flexible cables 11 and each of the welding sheets 21 may be alternately arranged in layers, respectively.

The cable stack structure 10 according to the present embodiment includes four flat flexible cables 11, and the terminal access portion 15 of each flat flexible cable 11 includes four conductor wires 12, and the welding sheets 21 of the high current terminal 20 includes four sheets.

Accordingly, as illustrated in FIG. 6, each terminal access portion 15 of the four flat flexible cables 11 may be arranged in each of the spaces between the four welding sheets 21, thereby forming a connecting portion C between the cable stack structure 10 and the high current terminal 20. In this case, as illustrated in FIG. 7, from a lowermost end, each terminal access portion 15 of the four flat flexible cables 11 and the four welding sheets 21 are alternately arranged in layers in an order of from a first-layer welding sheet 21, a first-layer terminal access portion 15, a second-layer welding sheet 21, a second-layer terminal access portion 15, a third-layer welding sheet 21, a third-layer terminal access portion 15, a fourth-layer welding sheets 21, and to a fourth-layer terminal access portion 15. In addition, the terminal access portions 15 and the welding sheets 21 may be bonded to each other by welding and thus firmly connected to each other. Therefore, the cable stack structure 10 and the high current terminal 20 are not easily separated even by strong vibration or impact.

As a method of welding the terminal access portions 15 and the welding sheets 21, ultrasonic welding, resistance welding, brazing welding, etc. may be applied. In the present embodiment, brazing welding is applied.

In general, brazing welding is a welding method of bonding two base metals by melting a filler metal having a lower melting point than a base metal, and it is difficult to melt the filler metal to evenly permeate between the base metals. In order to improve this, each of the welding sheets 21 may be formed of a silver (Ag)-plated copper plate. In other words, each of the welding sheets 21 according to the present embodiment includes a silver plating layer (not shown).

According to the above configuration, while the terminal access portions 15 and the welding sheets 21 are alternately arranged one by one in layer, the terminal access portions 15 and the welding sheets 21 may be bonded to each other through brazing welding, and here, the silver plating layer of each welding sheet 21 may act as a filler metal. Accordingly, no additional filler metal is required during the brazing welding. In addition, since the silver plating layer is melted and the silver component is uniformly and widely spread between the terminal access portions 15 and the welding sheets 21, the welding quality and electrical conductivity may be improved.

The middle part 23 is a portion via which the welding sheets 21 are connected in multiple stages, and may be provided in a form of a block or a rectangular plate having a certain thickness. As one end portions of the welding sheets 21 are connected to the middle part 23 at certain intervals in multiple stages, the intervals may be maintained constant.

The middle part 23 may have a broad plate surface having a size corresponding to a cross-sectional area of the cable stack structure 10. For example, as illustrated in FIG. 2 or FIG. 5, the middle part 23 may have a plate surface of a size (length x width) not exceeding a cross-sectional area (thickness x width) of the cable stack structure 10, and thus may be advantageous for providing the high current terminal 20 that is compact and lightweight.

The fastening part 25 may have a bolt-fastening hole 25a and may be provided in a plate shape extending in a direction opposite to the welding sheets 21 with the middle part 23 therebetween. For example, the fastening part 25 may have a rectangular plate shape having a certain thickness and may extend horizontally from a middle height of the middle part 23. The fastening part 25 may be connected to a terminal of a battery module or a terminal of an electric part such as a relay device. For example, the fastening part 25 and a terminal of a counterpart may be butted, and a bolt may be inserted into the bolt-fastening hole 25a and tightened using a nut.

The welding sheets 21, the middle part 23, and the fastening part 25 may be integrally formed of, for example, a metal material such as copper (Cu). That is, the welding sheets 21, the middle part 23, and the fastening part 25 are conceptually distinct elements, and may be integrally formed as a single body.

The FFC bus bar according to the present embodiment may further include a compression band 40 surrounding a portion in which the terminal access portion 15 of each of the flat flexible cables 11 and each of the welding sheets 21 are integrated. The terminal access portions 15 and the welding sheets 21 may be further fixed and insulated using the compression band 40 after brazing welding. That is, as illustrated in FIG. 2, the connecting portion C between the cable stack structure 10 and the high current terminal 20 may be wrapped with the compression band 40 and pressed to strengthen fixation, and the connecting portion C may be insulated as exposure of the connecting portion C to the outside is prevented.

As described above, the FFC bus bar according to an embodiment of the present disclosure has a structure in which the terminal access portion 15 of each flat flexible cable 11 and each welding sheet 21 of the high current terminal 20 are in contact with each other on a one-on-one basis and welded into a single body in the contacting state, and thus, the mechanical rigidity of a connecting portion between each flat flexible cable 11 and the high current terminal 20 is high. Furthermore, by not using components such as rivets or brackets, the high current terminal 20 of the FFC bus bar may be simplified and reduced in size.

Figure 8:
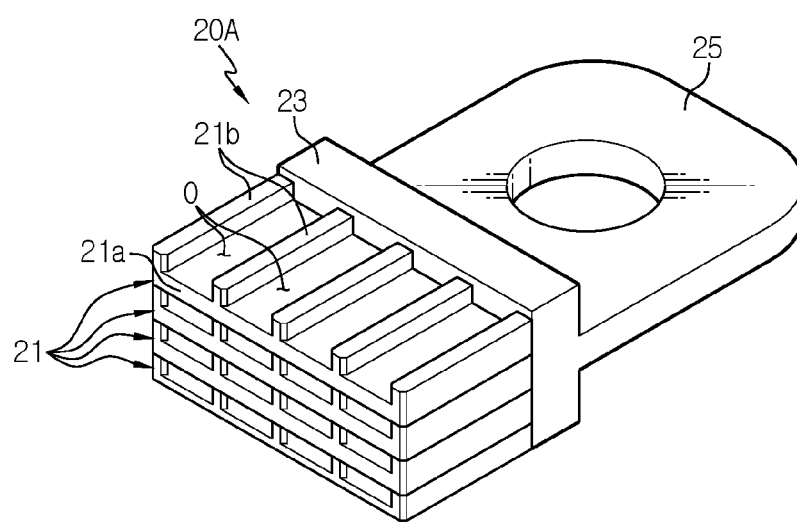
FIG. 8 illustrates a high current terminal according to another embodiment of the present disclosure.
Figure 9:
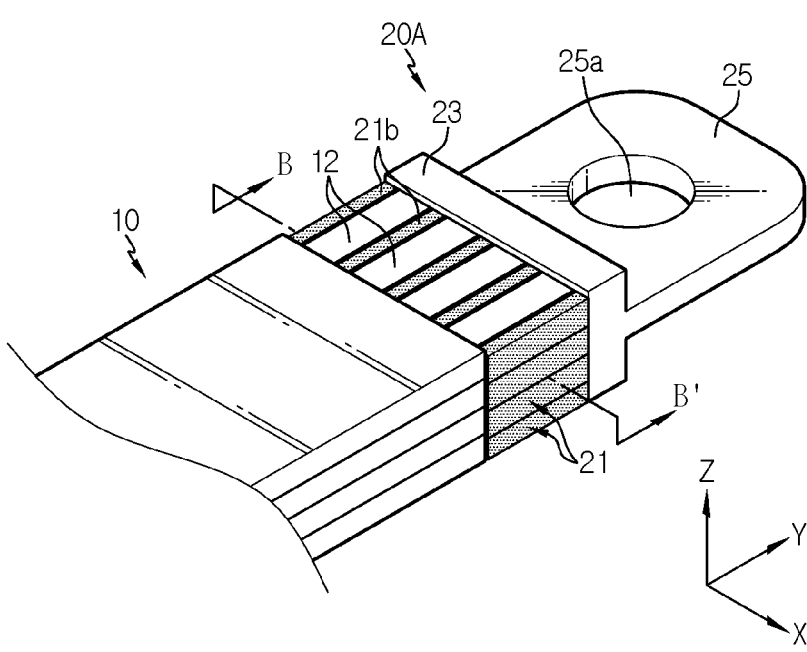
FIG. 9 illustrates a state in which a cable stack structure and a high current terminal, according to another embodiment of the present disclosure, are connected to each other.
Figure 10:
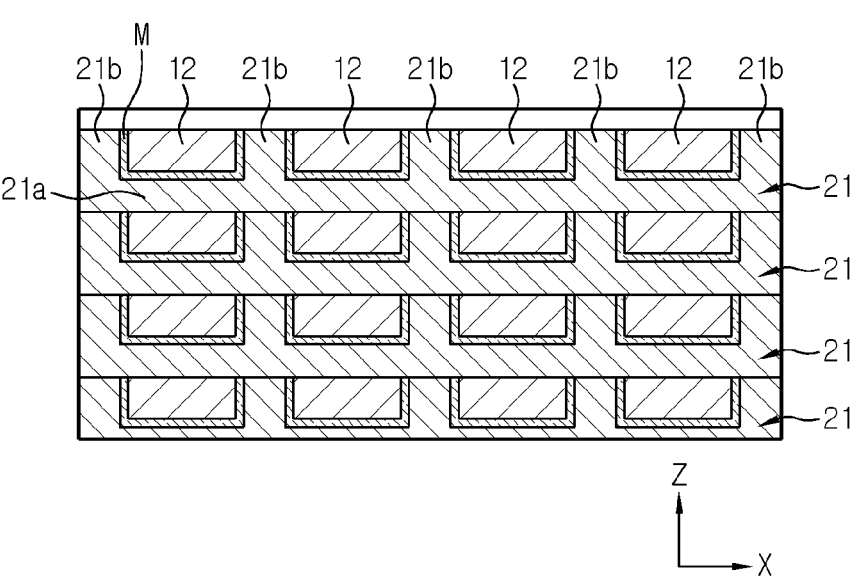
FIG. 10 is a cross-sectional view cut along line B-B' of FIG. 9.

FIG. 8 illustrates a high current terminal 20A according to another embodiment of the present disclosure. FIG. 9 illustrates a state in which a cable stack structure 10 and the high current terminal 20A, according to another embodiment of the present disclosure, are connected to each other. FIG. 10 is a cross-sectional view cut along line B-B' of FIG. 9.

Next, another embodiment of the present disclosure will be described with reference to FIGS. 8 through 10.

The same reference numerals denote the same members, and the repeated description of the same members will be omitted, and description will focus on differences from the above-described embodiment.

The present embodiment differs from the above-described embodiment in portions of welding sheets 21 of the high current terminal 20A and a configuration for brazing welding.

Each welding sheet 21 of the high current terminal 20A according to the present embodiment includes, as illustrated in FIG. 8, a flat base portion 21a and protrusions 21b protruding from a surface of the base portion 21a and provided in a width direction at certain intervals. In addition, the protrusions 21b may be elongated in a direction toward the terminal access portion 15, and due to these protrusions 21b, concave spaces O may be provided in the base portion 21a between the protrusions 21b.

Each of the conductor wires 12 forming the terminal access portion 15 may be arranged in each of the concave spaces O. That is, referring to FIGS. 9 and 10, in the present embodiment, each of the welding sheets 21 has five protrusions 21b on the base portion 21a in the width direction (X-axis direction), and four concave spaces O are provided between the protrusions 21b.

Four conductor wires 12 constituting each terminal access portion 15 may be arranged in the four concave spaces O, respectively. At least three surfaces of each conductor wire 12 may be surrounded by the protrusions 21b and the base portion 21a. In the present embodiment, the terminal access portion 15 of each flat flexible cable 11 and each welding sheet 21 may be alternately arranged in layers, and also, the conductor wires 12 of the terminal access portion 15 may be respectively stably arranged between the welding sheets 21 without shaking.

In addition, a silver plating layer M may be provided in the concave spaces O of the welding sheet 21. In other words, the silver plating layer M may be provided on surfaces of the protrusions 21b forming the concave spaces O and on a surface of the base portion 21a, and as the silver plating layer M is melted during brazing welding, the conductor wires 12 may be bonded to the welding sheets 21.

According to the above configuration, when the silver plating layer M is melted by heat, at least three surfaces of each conductor wire 12 may be bonded to the welding sheet 21. Thus, in the present embodiment, a greater contact area and bonding area between each welding sheet 21 and each conductor wire 12 may be secured compared to the above-described embodiment, and thus, each welding sheet 21 and each conductor line 12 may be connected to each other more firmly than in the above-described embodiment.

Meanwhile, a battery pack according to the present disclosure may be configured to include one or more of the above-described FFC bus bars. The FFC bus bar may be applied to connect two battery modules to each other in series or to electrically connect a terminal of a battery module to a relay or devices in the battery pack.

The battery pack may further include, in addition to the FFC bus bar, one or more battery modules including a cell stack structure which is a set of a plurality of battery cells, and a BMS, fuse, a relay, and the like, as a control device for controlling charging or discharging of the battery modules or a current flow of the battery modules based on voltage and temperature of the battery modules.

The battery pack may be applied to a vehicle such as an electric vehicle or a hybrid vehicle. The battery pack may also be applied to a power storage device or other IT products.

While preferred embodiments of the present disclosure have been illustrated and described, the present disclosure is not limited to the specific preferred embodiments described above, and it will be obvious to anyone with ordinary skill in the art, to which the present disclosure pertains, to make various modifications without departing from the gist of the present disclosure as claimed in the claims, and such modifications are within the scope of the claims.

In the present specification, while terms indicating directions such as up, down, left, right, etc. have been used, it will be obvious to those skilled in the art that these terms are only for convenience of description and may be expressed differently depending on the viewing position of the observer or the location of the object.

What is claimed is:

1. A flat flexible cable (FFC) bus bar comprising:
   a plurality of FFCs stacked one upon another; and
   a high current terminal connected to at least one end portion of the stacked plurality of FFCs,
   wherein each FFC comprises a respective terminal access portion including a respective plurality of strands of conductor wires positioned at the at least one end portion of the stacked plurality of FFCs, and
   each respective terminal access portion is welded to the high current terminal,
   wherein the high current terminal comprises a plurality of welding sheets, wherein each welding sheet is a thin plate, wherein the terminal access portions of the plurality of FFCs and the plurality of welding sheets are arranged in alternating layers such that the inner alternating layers contact the alternating layers directly above and directly below, and wherein the terminal access portions of the plurality of FFCs are welded with the plurality of welding sheets into a single body.

2. The FFC bus bar of claim 1, wherein the high current terminal comprises:

a middle part connected to the welding sheets; and a fastening part comprising a bolt-fastening hole and extending from the middle part away from the welding sheets.

3. The FFC bus bar of claim 2, wherein the welding sheets, the middle part, and the fastening part are integrally formed of a metal material.

4. The FFC bus bar of claim 2, wherein the middle part is a rectangular plate, and a surface of the middle part facing toward the plurality of FFCs has a surface area corresponding to a cross-sectional area of the plurality of FFCs.

5. The FFC bus bar of claim 2, wherein each welding sheet is a silver-coated copper plate.

6. The FFC bus bar of claim 2, wherein each welding sheet comprises:

a flat base portion; and a plurality of protrusions protruding from a surface of the base portion at fixed intervals, wherein each of the plurality of protrusions extends from the middle part of the high current terminal along a width direction of the flat base portion, wherein, for each respective welding sheet, the plurality of strands of conductor wires of the terminal access portion stacked adjacent to the respective welding sheet are arranged in concave spaces between the plurality of protrusions of the respective welding sheet.

7. The FFC bus bar of claim 6, further comprising a silver plating layer positioned in the concave spaces.

8. The FFC bus bar of claim 1, further comprising a heat shrink tube integrally surrounding the plurality of FFCs.

9. The FFC bus bar of claim 1, further comprising a compression band surrounding a circumference of a portion of the FFC bus bar in which the plurality of terminal access portions and the plurality of welding sheets are arranged.

10. The FFC bus bar of claim 1, wherein each welding sheet of the plurality of welding sheets comprises a filter metal to fill a space between the terminal access portions directly above and below the welding sheet.

11. The FFC bus bar of claim 10, wherein each welding sheet is a copper plate having a silver coating, wherein the silver coating is configured to uniformly spread between the terminal access portions and the welding sheets when the terminal access portions are welded with the plurality of welding sheets.

12. A battery pack comprising the FFC bus bar according to claim 1.

* * * * *